United States Patent
Herring et al.

(10) Patent No.: US 6,958,987 B1
(45) Date of Patent: Oct. 25, 2005

(54) DECT-LIKE SYSTEM AND METHOD OF TRANSCEIVING INFORMATION OVER THE INDUSTRIAL-SCIENTIFIC-MEDICAL SPECTRUM

(75) Inventors: Christopher M. Herring, Longmont, CO (US); Dannie G. Feekes, Lafayette, CO (US); Alexandre Jose C. Silva Sousa, Massama (PT)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/478,144

(22) Filed: Jan. 5, 2000

(51) Int. Cl.[7] .......................... H04Q 7/24; H04B 7/212
(52) U.S. Cl. .................................... 370/338; 370/347
(58) Field of Search ................................ 370/277, 278, 370/280, 294, 295, 329, 330, 337, 341, 347, 338, 335, 342, 310, 340, 343, 344; 375/132

(56) References Cited

U.S. PATENT DOCUMENTS

| | | | |
|---|---|---|---|
| 5,239,545 A | 8/1993 | Buchholz | |
| 5,307,348 A | 4/1994 | Buchholz et al. | |
| 5,495,482 A | 2/1996 | White et al. | |
| 5,537,434 A | 7/1996 | Persson et al. | |
| 6,104,726 A | 8/2000 | Yip et al. | |
| 6,181,920 B1 | 1/2001 | Dent et al. | |
| 6,256,298 B1 | 7/2001 | Nakajo | |
| 6,275,506 B1 * | 8/2001 | Fazel et al. | 370/478 |
| 6,385,189 B1 | 5/2002 | Kurtz | |
| 6,393,007 B1 * | 5/2002 | Haartsen | 370/337 |
| 6,393,014 B1 | 5/2002 | Daly et al. | |
| 6,430,174 B1 | 8/2002 | Jennings et al. | |
| 6,434,183 B1 * | 8/2002 | Kockmann et al. | 370/337 |
| 6,493,338 B1 | 12/2002 | Preston et al. | |
| 2002/0034171 A1 * | 3/2002 | Smith et al. | 370/337 |

* cited by examiner

*Primary Examiner*—Chau Nguyen
*Assistant Examiner*—Soon D. Hyun
(74) *Attorney, Agent, or Firm*—Toler, Larson & Abel, LLP

(57) ABSTRACT

A system and method employs standard DECT hardware adapted for use in the Industrial-Scientific-Medical (ISM) Spectrum wherein a Frequency Hopping Spread Spectrum (FHSS), multiple carrier, time-division-multiple-access (TDMA), time-division-duplex (TDD) technique provides wireless communications over the ISM Spectrum while employing standard DECT hardware. A baseband processor provides slot and frame timing to a RF sub-module wherein the preferred, although not exclusive number of carrier frequencies is programmed to seventy-five ranging between 2401.122 MHz to 2479.813 MHz and spaced 1.063 MHz apart and wherein each of the seventy-five channels supports a ten-millisecond frame preferably, although not exclusively, comprised of sixteen time slots.

21 Claims, 6 Drawing Sheets

DECT-LIKE SYSTEM AND METHOD OF TRANSCEIVING INFORMATION OVER THE INDUSTRIAL-SCIENTIFIC-MEDICAL SPECTRUM

CROSS REFERENCE TO RELATED APPLICATIONS

This application is related to commonly assigned and co-pending U.S. patent application Ser. No. 09/477,876 entitled "System And Method For Concurrent Wireless Voice And Data Communications" contemporaneously filed herewith and herein incorporated by reference.

BACKGROUND OF THE INVENTION

1. Field of the Invention

The invention relates generally to wireless communications and more specifically to a system and method employing standard DECT hardware to operate in the Industrial-Scientific-Medical (ISM) band.

2. Description of Related Art

The following background information is provided to aid in the understanding of the application of the present invention and is not meant to be limiting to the specific examples set forth herein. The so-called "Industrial-Scientific-Medical (ISM)" band allows for unlicensed wireless operation in the 2.4 GHz spectrum (as well as the 900 MHz and 5.8 GHz spectrum) provided however, that the power output is less than one watt and that some form of spread spectrum technology, i.e. Frequency Hopping Spread Spectrum (FHSS), Direct Sequence Spread Spectrum (DSSS) or a hybrid of FHSS and DSSS, is used to minimize interference. In the United States, 47 CFR Part 15 specifies the use of at least seventy-five (75) hopping frequencies between 2.4 GHz and 2.4835 GHz and a minimum hop rate of 2.5 hops per second for FHSS systems. Several schemes have been proposed to use the ISM spectrum for wireless data communication applications, such as for Wireless Local Area Networks (WLANs).

In its 802.11 standard, the IEEE promulgated, inter alia, FHSS and DSSS definitions for the physical layer of a WLAN. For FHSS in North America and most of Europe, IEEE 802.11 requires 79 channels in 1 MHz steps beginning at 2.402 GHz and ending at 2.480 GHz with a minimum frequency hop of 6 MHz. FIG. 9 depicts the IEEE 802.11 protocol for packetizing information in a FHSS WLAN. One-hundred-twenty-eight (128) bits (a 96 bit preamble and 32 bit header) are sent to assist in synchronizing after a carrier hops from one frequency to the next. Payload data then follows in sizes ranging from 1 to 4095 bytes.

An example of an ISM FHSS WLAN is the HomeCast™ Open Protocol (HOP™) from Alation Systems Inc. of Mountain View, Calif. embodied in one form as the Home-Free™ Wireless Network product from Diamond Multimedia Systems, Inc. of Vancouver, Wash. The HOP system provides 79 channels and a maximum data throughput of 1 Mbps but employs a proprietary ISM baseband processor, requires a host processor to implement a software MAC, and does not support voice communications.

The so-called "PRISM I" chipset from the Intersil Corporation of Melbourne, Fla., is an example of a DSSS WLAN implementation in compliance with the IEEE 802.11 standard. The PRISM I chipset comprises six discrete integrated circuits, requires a proprietary baseband processor, and while maintaining IEEE 802.11 compliant, can only achieve a maximum data throughput of 2 Mbps and does not support voice communications. It can be seen therefore, that the PRISM I DSSS solution while improving data throughput, also increases chip count and cost and locks the design into proprietary hardware.

By way of further background, reference is made to FIG. 1 that depicts the prior art Digital Enhanced Cordless Telecommunications (DECT) standard protocol promulgated by the European Telecommunications Standards Institute (ESTI). The DECT standard defines a Multiple Carrier, Time-Division-Multiple-Access (TDMA), Time-Division-Duplex (TDD) protocol with ten channels (carrier frequencies) between 1881.792 MHz and 1897.344 MHz spaced 1.728 MHz apart. Each of the ten channels supports a ten-millisecond frame comprised of twenty-four time slots. TDD is provided by allocating twelve of the twenty-four slots for base station to cordless handset communications and the other twelve slots for cordless handset to base station communications. Each time slot comprises 480 bits with a 32-bit preamble for synchronization, 388 bits for data and 60 bits for guard time. The 388 data bits are further divided into an A-field, a B-field and 4 parity bits for error detection. The A-field comprises an 8-bit header, 40 bits of control information and 16 cyclic redundancy check (CRC) bits while the B-field provides 320 bits of data.

For speech applications, analog signals are digitized and encoded using adaptive differential pulse code modulation (ADPCM). Frequency hopping is employed to avoid interference by periodically assigning a different one of the ten channel frequencies to each of the twenty-four time slots. A form of frequency shift keying known as Gaussian filtered, minimum shift keying (GMSK) is used to modulate the transmitted signal to provide continuous phase transitions between two adjacent symbols.

DECT enabled products are ubiquitous in Europe ranging from telephones and WLANs to cordless terminal mobility (CTM) applications wherein a cordless handset operates with both private and public base stations. Unfortunately in the United States as well in other countries, the DECT spectrum between 1881.792 MHz and 1897.344 MHz is licensed for Personal Access Communication Systems (PACS) and is not available for unlicensed applications such as WLANS.

From the foregoing it can be seen that there is a need for a system and method employing standard DECT hardware but operates in the unlicensed Industrial-Scientific-Medical (ISM) spectrum.

SUMMARY OF THE INVENTION

To overcome the limitations of the prior art described above, and to overcome other limitations that will become apparent upon reading and understanding the present specification, the present invention discloses a system and method employing standard DECT hardware adapted for use in the Industrial-Scientific-Medical (ISM) Spectrum. A Frequency Hopping Spread Spectrum (FHSS), multiple carrier, time-division-multiple-access (TDMA), time-division-duplex (TDD) technique provides wireless communications over the ISM Spectrum while employing standard DECT hardware to map and morph the DECT protocol to operate within the ISM spectrum. A baseband processor provides, among other things, slot and frame timing to a RF submodule. The preferred, although not exclusive number of carrier frequencies is programmed to seventy-five ranging between 2401.122 MHz to 2479.813 MHz and spaced 1.063 MHz apart. Each of the seventy-five channels supports a ten-millisecond frame preferably although not exclusively comprised of sixteen time slots. TDD is provided by allocating half of the slots for first to second tranceiving unit communications and the other half for second to first tranceiving unit communications.

A feature of the present invention is that standard hardware may be employed for either DECT or ISM applications.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of DECT-Like System and Method of Transceiving Information Over The Industrial-Scientific-Medical Spectrum in accordance with the principles of the present invention.

DESCRIPTION OF THE PREFERRED EMBODIMENT

Figure 1:
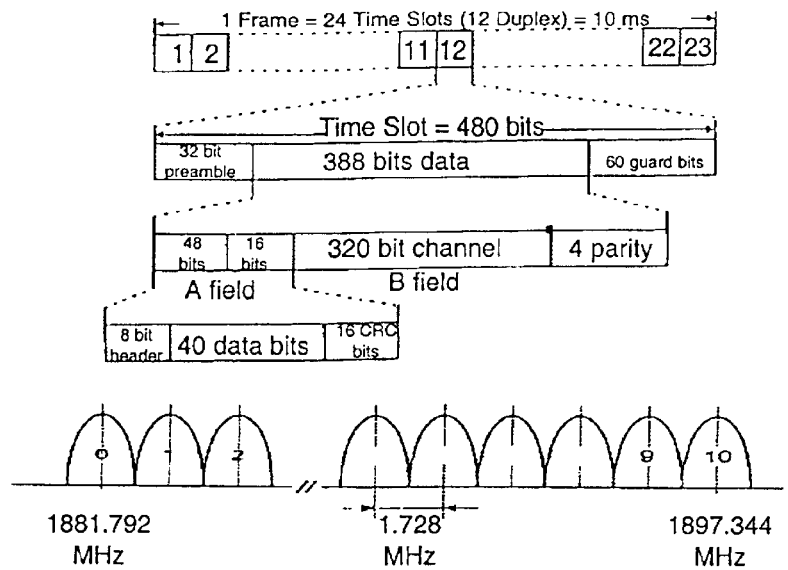
FIG. 1 depicts a prior art diagram of the Digital Enhanced Cordless Telecommunications (DECT) standard protocol promulgated by the European Telecommunications Standards Institute (ESTI)

The detailed description of the preferred embodiment for the present invention is organized as follows:
1.0 Exemplary System
2.0 Exemplary Personal Access Device (PAD)
3.0 Exemplary Base Station
4.0 Exemplary Transceiver Module
5.0 PAD to Base Station Synchronization
6.0 PAD-to-PAD Communications
7.0 Conclusion.

This organizational table and the corresponding headings used in this detailed description are provided for the convenience of reference only and are not intended to limit the scope of the present invention. It is to be understood that while the preferred embodiment is described herein below with respect to DECT and DECT-like wireless protocols, it has general applicability to any digital wireless communications technology. Certain terminology known to practitioners in the field of wireless communications is not discussed in detail in order not to obscure the disclosure. Moreover, in order not to obscure the disclosure with structural details which will be readily apparent to those skilled in the art having the benefit of the description herein, the structure, control and arrangement of conventional circuits have been illustrated in the drawings by readily understandable block representations showing and describing details that are pertinent to the present invention. Thus, the block diagram illustrations in the figures do not necessarily represent the physical arrangement of the exemplary system, but are primarily intended to illustrate the major structural components in a convenient functional grouping, wherein the present invention may be more readily understood.

Figure 2:
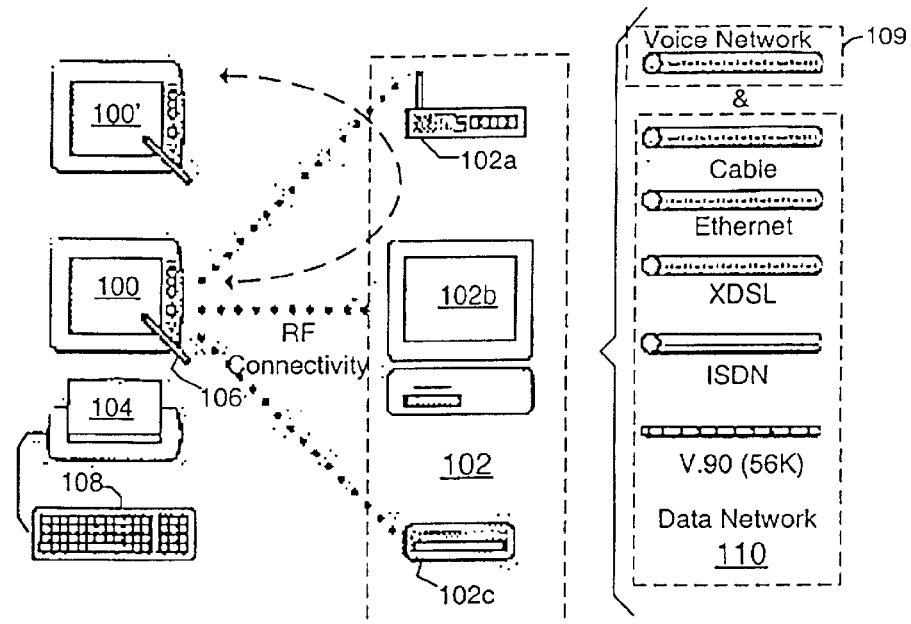
FIG. 2 depicts an illustrative but not limiting block diagram of a concurrent wireless voice and data communications system practiced in accordance with the principles of the present invention.

Reference is now made to the accompanying drawings, which form a part hereof, and in which is shown by way of illustration specific embodiments in which the invention may be practiced. It is to be understood that other embodiments may be utilized and structural changes may be made without departing from the scope of the present invention.
1.0 Exemplary System Reference is now made to FIG. 2 that depicts an illustrative but not limiting block diagram of a concurrent wireless voice and data communications system practiced in accordance with the principles of the present invention. A Personal Access Device (PAD) 100 and base station 102 employ the present invention to provide RF connectivity therebetween. The PAD 100 preferably resides in a charging cradle 104 to keep rechargeable batteries (not shown) refreshed when not is use. When the PAD 100 is stationary and docked on the charging cradle 104, commands may be entered with an optional keyboard 108 such as through the USB port 117 (depicted in FIG. 3). When the PAD 100 is mobile, commands may be entered on the touch screen/touch keyboard (described in more detail herein below) of the PAD 100 with a detachable stylus 106 that resides within a storage cavity formed in case of the PAD 100. The PAD 100 includes a microphone and speakers (described below) to support full duplex phone communications.

The base station 102 may manifest itself as an advanced set-top box 102a coupled to a television-like monitor (not shown), a stand-alone personal computer 102b or as a low cost stand alone device 102c with no display. The base station 102 is tethered to a voice network 109 that may manifest itself as but is not limited to a PSTN, and to a data network 110 that may manifest itself as but is not limited to, an Ethernet adapter, CATV, XDSL, ISDN or V.90 modems.
2.0 Exemplary Personal Access Device (PAD)

Figure 3:
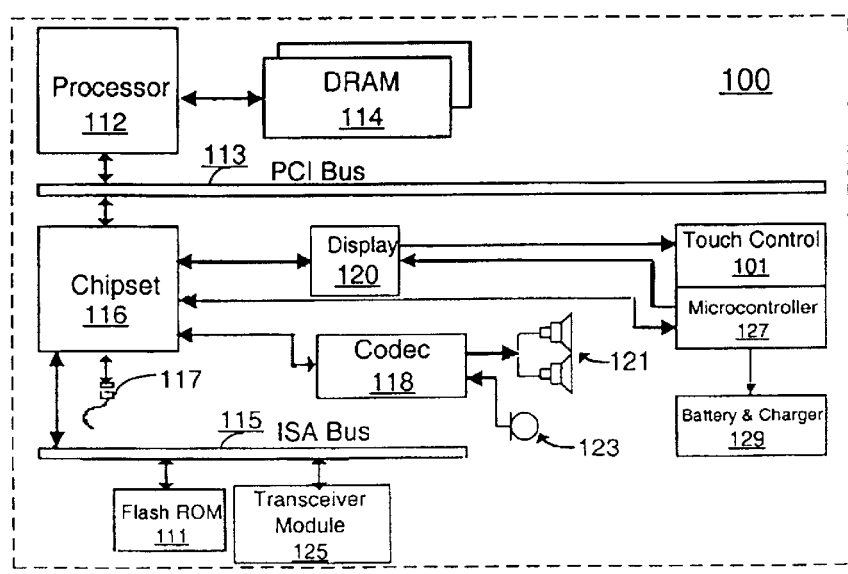
FIG. 3 depicts an illustrative but not limiting block diagram of a preferred Personal Access Device (PAD) practiced in accordance with the principles of the present invention.

Reference is now made to FIG. 3 that depicts an illustrative but not limiting block diagram of a preferred PAD 100 practiced in accordance with the principles of the present invention. A highly integrated processor 112 such as but not limited to, the Geode™ family of processors from National Semiconductor Corporation, Santa Clara, Calif., is coupled to DRAM 114 through an integrated DRAM controller (not shown) in the processor 112. A so-called "south bridge" chipset 116 is coupled to the processor 112, preferably through a PCI bus 113. The south bridge chipset 116 preferably includes an integrated ISA bus controller coupled to an ISA bus 115, a USB port 117 for supporting, inter alia, the keyboard 108 and FIFO buffers coupled to an audio CODEC 118. A flash ROM 111 is connected to the ISA bus 115 for storing code (such as an operating system and application programs) that is shadowed into DRAM 114 for execution by processor 112. The audio CODEC 118 converts digital signals to analog signals and drives speakers 121 and receives and converts analog signals from a monaural microphone 123 to digital signals for processing by processor 112. The display 120, which preferably is a DSTN or TFT LCD, is refreshed by a display adapter (not shown) that is integrated into either the processor 112 or chipset 116. The display 120 includes an overlaid programmable touch control panel 101 controlled by microcontroller 127 for use with removable stylus 106. The microcontroller 127 also provides charge profiling for rechargeable battery 129. The transceiver module 125 (discussed in more detail hereinbelow) is preferably, although not exclusively, connected to the ISA bus 115 for providing a wireless link to the base station 102.

3.0 Exemplary Base Station

Figure 4:
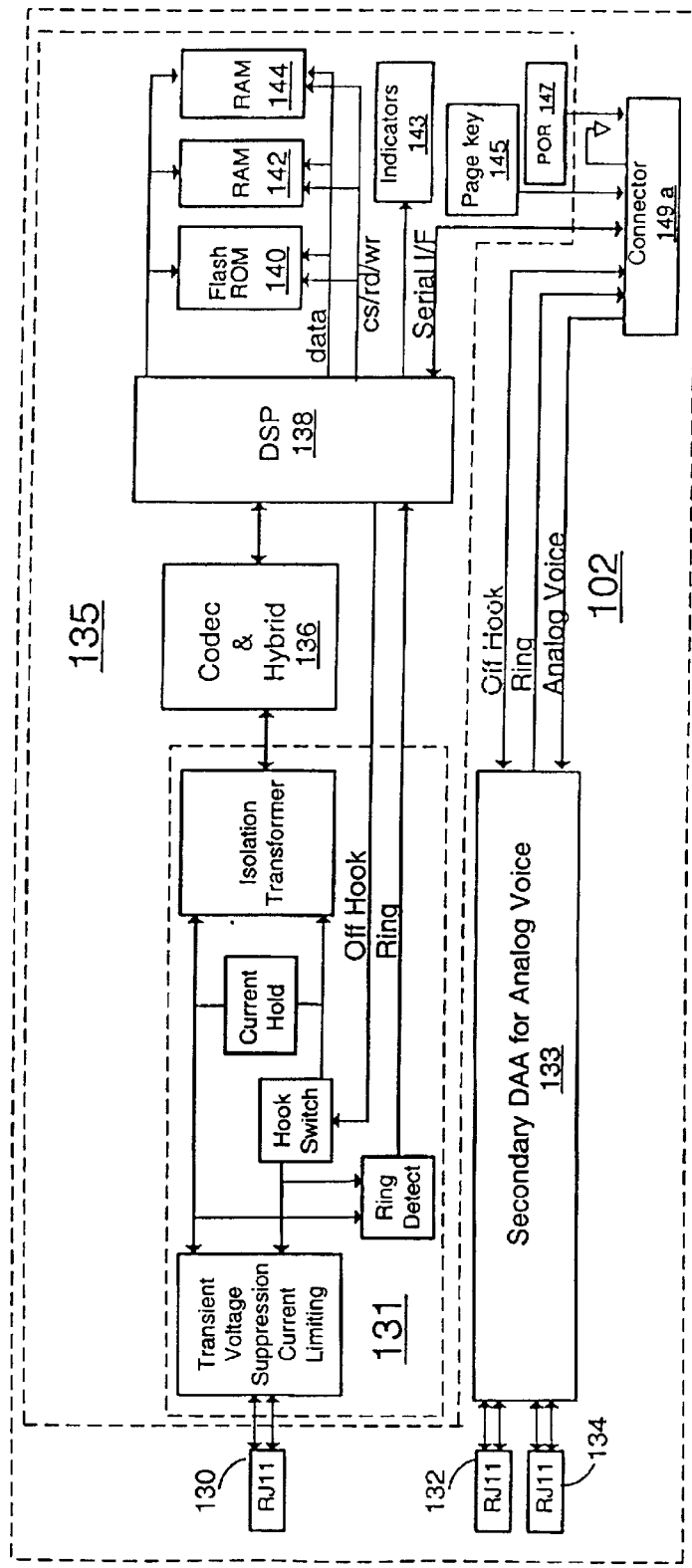
FIG. 4 depicts a first exemplary but not limiting block diagram of a first preferred base station practiced in accordance with the principles of the present invention.

Reference is now made to FIG. 4 that depicts a block diagram of the first preferred base station 102 without the transceiver module 125 installed, practiced in accordance with the principles of the present invention. While the first exemplary embodiment of the base station 102 is depicted as having a V.90 modem 135, those skilled in the art will readily recognize with the aid of the present disclosure, other forms of data network interfaces including but not limited to, ISDN, DSL and CATV modems and network adapters such as, but not limited to, Ethernet without departing from the scope of the present invention. The V.90 modem interface 135 of the base station 102 is coupled to a Public switched telephone network (PSTN) through RJ11 jack 130. RJ11 jack 130 connects a first analog phone line through a first Digital Access Arrangement (DAA) 131 included within the V.90 modem 135. A combined CODEC/hybrid circuit 136 separates transmitted signals from received signals from the PSTN and converts the received signals into digital form. The received digital signals are operated on by a digital signal processor (DSP) 138 that executes code out of flash ROM 140 and SRAM 142 and 144 to provide, inter alia, interface control, AT command processing, and processing functions needed to perform signal modulations. Through execution of the code, the DSP 138 provides a command line AT interpreter, error checking, retransmission, compression and decompression functions as well as necessary signal modulation/demodulation, adaptive filtering and encoding/decoding required for a V.90 standard modem.

A second RJ11 jack 132 connects a second analog phone line from the PSTN to a second DAA 133 for voice reception/transmission. An optional third RJ11 jack 134 may be used to connect an external handset (not shown) to the base station 102. Optional LED indicators 143 controlled by DSP 138 display status of device ready, data and voice transmission in progress. Optional page key 145 may be provided to signal the transceiver module 150 (depicted in FIG. 6) through connector 149a to emit a page signal to the PAD 100. A power on reset (POR) circuit 147 provides reset signals to circuitry on the base station 102 as well as through connector 149a to the transceiver module 125 (depicted in FIG. 6), described in more detail herein below.

Figure 5:
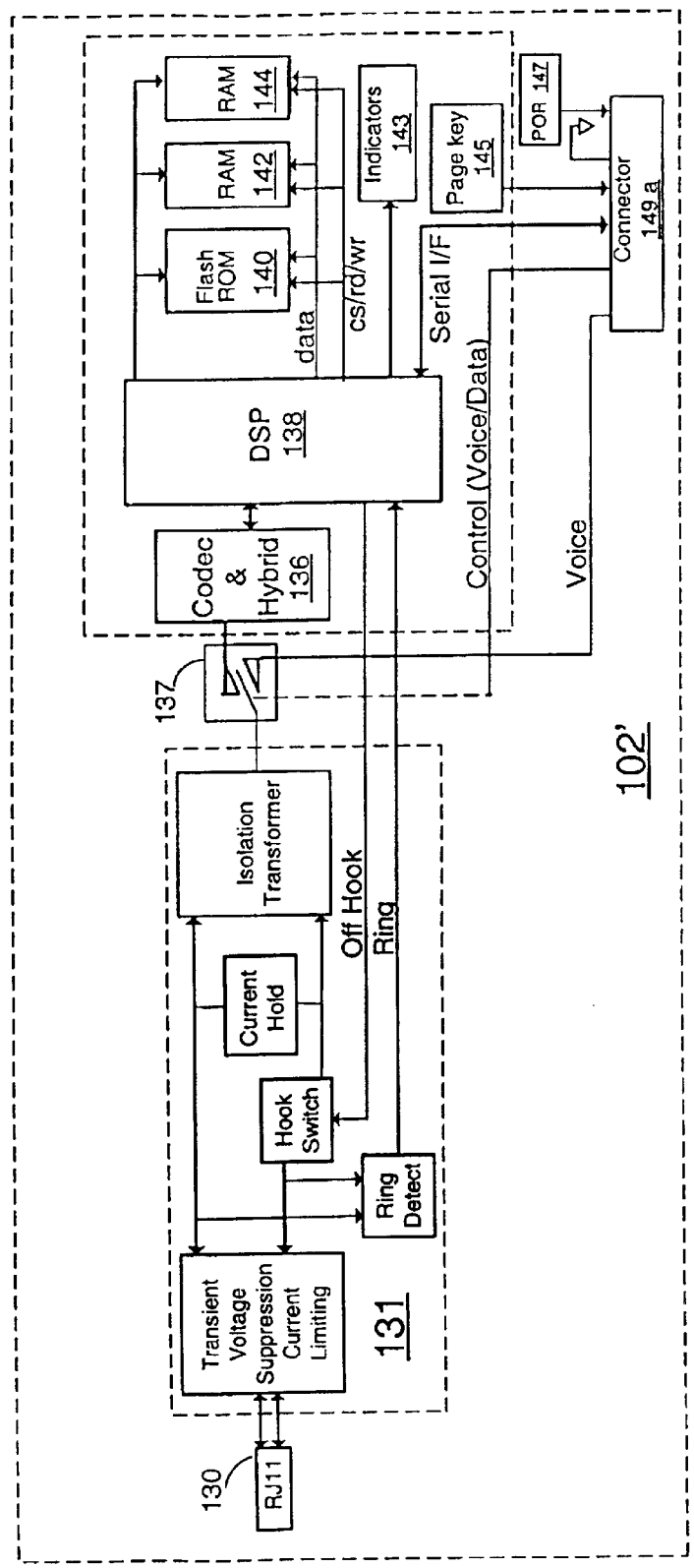
FIG. 5 depicts a second exemplary but not limiting block diagram of a second preferred base station practiced in accordance with the principles of the present invention.

Reference is now made to FIG. 5 that depicts a block diagram of a second preferred base station 102' without the transceiver module 125 installed, practiced in accordance with the principles of the present invention. The second preferred base station 102' is constructed similar to that of the first base station 102 except for the elimination of secondary DAA 133 and the addition of the relay 137. In the second preferred version of the base station 102', relay 137, which is controlled via the baseband processor 180 in transceiver module 125, switches the PSTN coupled through RJ11 jack 130 and DAA 131 to either the data network adapter (e.g. modem) or the ancillary analog voice channel (provided by the baseband processor 180 in transceiver module 125), all of which is discussed in more detail herein below.

Although while only one phone line is connected to the base station 102', the user of a PAD 100 can utilize the data network (via modem) and still be made aware of an incoming call via the transceiver module 125 that provides call notification and caller ID to allow the user of the PAD 100 to switch from the data network to the voice network. For example, this may manifest itself through a pop-up window on the PAD 100 notifying a single phone line user of PAD 100 (who may be surfing the world-wide-web) of an incoming phone call thus permitting the user of PAD 100 to switch from surfing the web to answer the phone call.

4.0 Exemplary Transceiver Module

Figure 6:
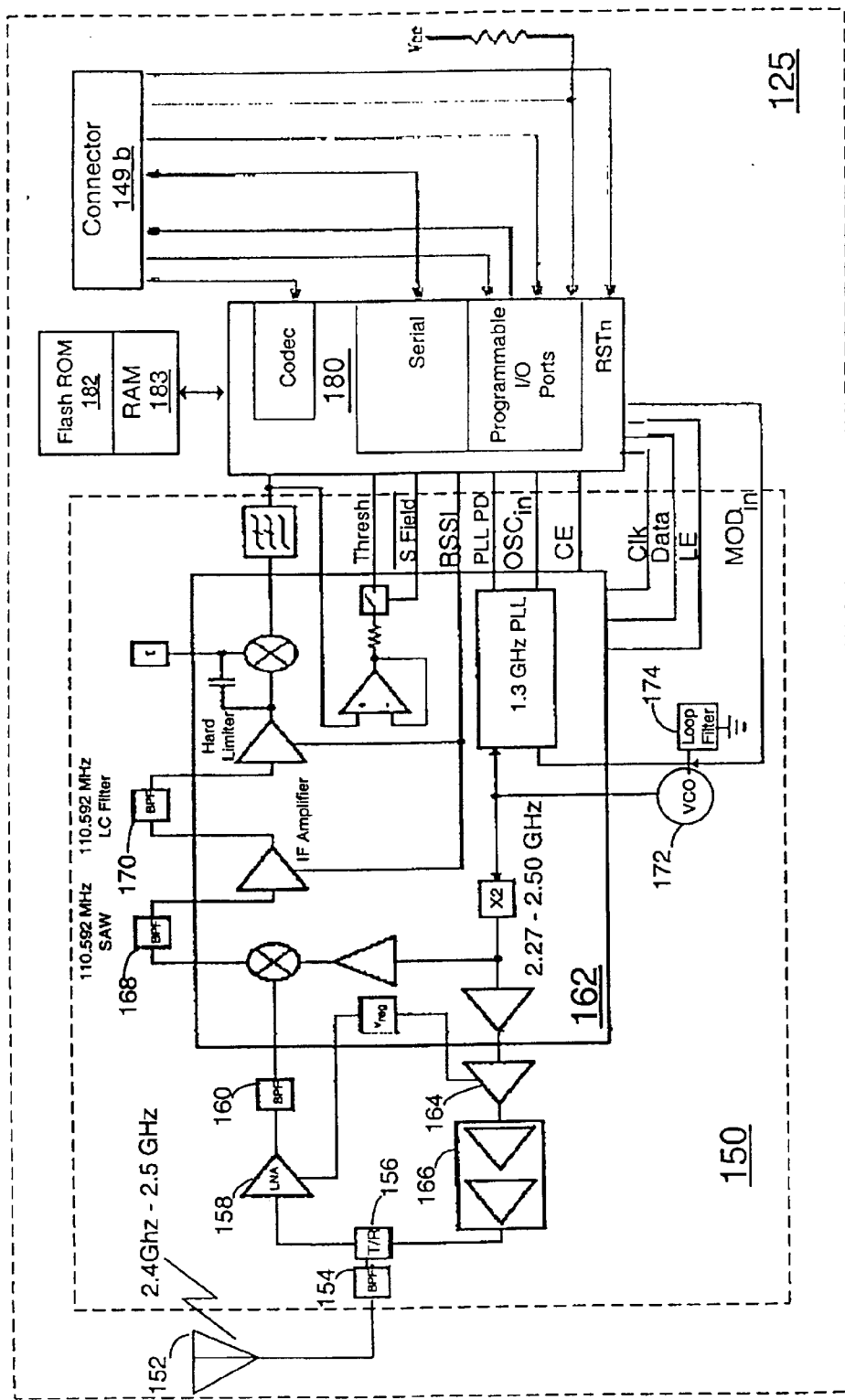
FIG. 6 depicts an exemplary but not limiting block diagram of a preferred transceiver module practiced in accordance with the principles of the present invention.

Reference is now made to FIG. 6 that depicts by way of illustration an exemplary but not limiting block diagram of the preferred transceiver module 125 practiced in accordance with the principles of the present invention. The transceiver module 125 comprises an antenna 152 (multiple antennas for diversity), an RF sub-module 150 coupled to a baseband processor 180, a flash ROM 182 and RAM 183 to store code for execution by the baseband processor 180 and a mating connector 149b for connecting to either the base station connector 149a or to the ISA bus 115 in the PAD 100.

The RF sub-module 150 includes, inter alia, a band pass filter (BPF) 154 coupled to a transmit/receive switch 156. Received data from the transmit/receive switch 156 is conditioned by a low noise amplifier (LNA) 158 and a BPF 160 prior to being sent to a mixer within single chip radio transceiver 162. Transmitted data from the single chip radio transceiver 162 is passed through a LNA 164 and transmit power amplifier 166 prior to being sent to transmit/receive switch 156. An exemplary but not limiting example of a single chip containing the BPFs 154 and 160, LNAs 158 and 164, transmit/receive switch 156 and power amplifier 166 is the AU2404T RF front-end integrated circuit from Alation Systems Inc. of Mountain View, Calif. Those skilled in the art, with the aid of the present disclosure, will recognize other forms and solutions for elements 154, 156, 158, 160, 164 and 166 without departing from the spirit and scope of the present invention.

The single chip radio transceiver 162 in combination with BPFs 168 and 170 and voltage controlled oscillator (VCO) 172 and loop filter 174 down convert (receive) or up convert (transmit) data to/from baseband processor 180. The preferred although not exclusive embodiment for the single chip radio transceiver 162 is the LMX3162 transceiver from National Semiconductor Corporation of Santa Clara, Calif., described in the *National Analog and Interface Products Databook* (and accompanying CD-ROM), 1999, which is herein incorporated by reference. The RF sub-module 150 is available from ALPS Electric Co, Ltd. of Tokyo, Japan under the model numbers UGSA4-402A (without antenna diversity) and UGSA4-502A (with antenna diversity) for 2.4 GHz operation and under the model numbers UGSE2-402A (without antenna diversity) and UGSE2-502A (with antenna diversity) for 1.8 GHz (DECT) operation.

The baseband processor 180 preferably comprises a CODEC and at least one sub-processor that executes code stored in flash ROM 182 and RAM 183 to handle, inter alia, audio, signal and data processing for tone generation, echo canceling and to program slot and frame timing for the RF sub-module 150. In general, the code executed by the baseband processor 180 in the transceiver module 125 is preferably layered in adherence with the Open Systems Interconnection (OSI) model, the details of which are known to one skilled in the art. The preferred although not exclusive embodiment for the baseband processor 180 is the SC14424 baseband processor from National Semiconductor Corporation of Santa Clara, Calif., described in detail in Appendix A hereto.

Figure 7:
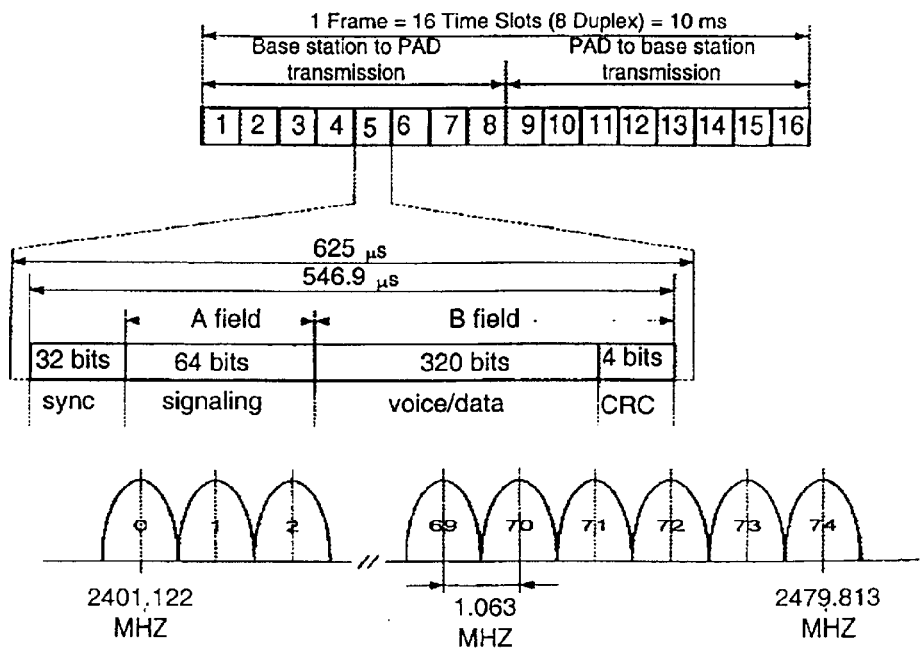
FIG. 7 depicts the preferred protocol for a concurrent wireless voice and data communications system practiced in accordance with the principles of the present invention.

Reference is now made to FIG. 7 that depicts the preferred protocol for a concurrent wireless voice and data communications system practiced in accordance with the principles of the present invention. The preferred protocol is a multiple carrier, Time-division-multiple-access (TDMA), Time-division-duplex (TDD) system. The preferred programmable, although not exclusive number of carrier frequencies is seventy-five ranging between 2401.122 MHz to 2479.813 MHz and spaced 1.063 MHz apart. Those skilled in the art having the benefit of the description herein will appreciate other numbers of carrier frequencies (e.g. ten), frequency spectrums (e.g. 1881.792 MHz to 1897.344 MHz) and spacings (e.g. 1.728 MHz apart) without departing from the scope the present invention. Each of the seventy-five channels supports a ten-millisecond frame preferably comprised of sixteen time slots. Those skilled in the art having the benefit of the description herein will appreciate other numbers of time slots without departing from the scope the present invention. Symmetrical TDD is provided by allocating half (i.e. eight of the sixteen slots) for base station to PAD communications and the other half (i.e. eight slots) for PAD to base station communications. Asymmetrical TDD is contemplated as well wherein base station to PAD communications consume more slots (e.g. twelve slots) than PAD to base station communications (i.e. four slots) or vice versa. Those skilled in the art having the benefit of the description herein will appreciate other asymmetric numbers of slot allocations for base station to PAD communications and vice versa without departing from the scope the present invention.

Each time slot preferably comprises a 32-bit preamble for synchronization, a 64 bit A-field for signaling and a B-field comprising 320 bits and 4 bits for CRC. Each of the sixteen time slots receives/transmits on one of the seventy-five carrier channels that preferably changes in a pseudo-random fashion, to one of the other seventy-four carrier channels after two consecutive frames thus providing fifty (50) hops/second. Those skilled in the art having the benefit of the description herein will appreciate other number of frequency carriers, hopping patterns and frequency hop periods without departing from the scope the present invention.

Figure 8:
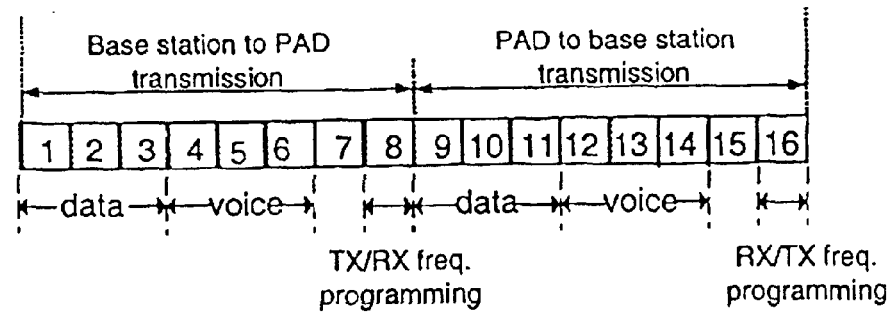
FIG. 8 depicts the preferred TDMA protocol for a concurrent wireless voice and data communications system practiced in accordance with the principles of the present invention; and, FIG. 9 depicts a prior art IEEE 802.11 protocol for packetizing information in a frequency hopping spread spectrum wireless local area network.
Figure 8:
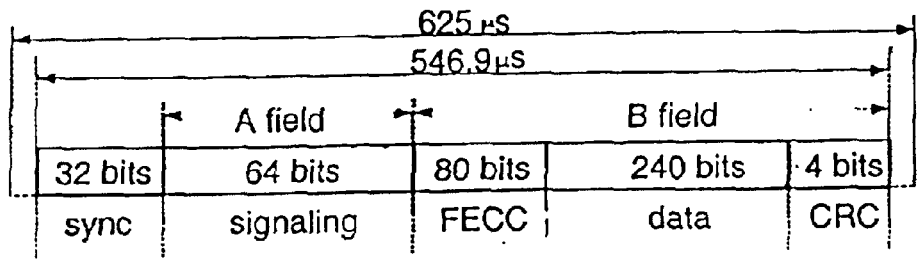
Figure 8:
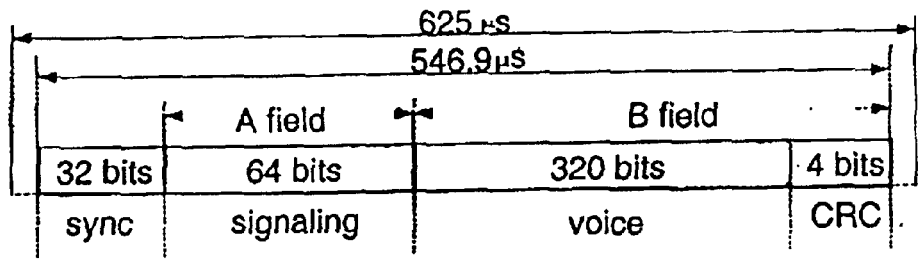
Figure 9:
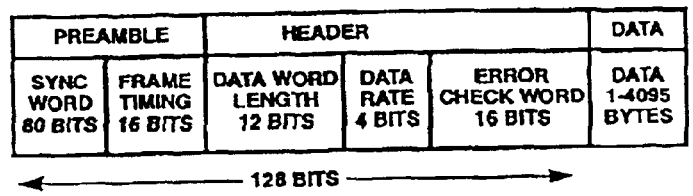

Reference is now made to FIG. 8 that depicts the preferred TDMA protocol in more detail. In the preferred embodiment, symmetric TDMA (with respect to both voice/data and base station/PAD communications) is provided by allocating time slots 1, 2, 3 and 9, 10, 11 for data communication between base station and PAD and PAD and base station, respectively, and time slots 4, 5, 6 and 12, 13, 14 for voice communication between base station and PAD and PAD and base station, respectively. Time slots 7 and 15 are reserved, time slot 8 is allocated to program the transmit carrier frequency in the single chip radio transceiver 162 and slot 16 is allocated to program the receive carrier frequency.

Asymmetrical TDMA is contemplated as well wherein data communications consume more slots (e.g. twelve slots) than voice communications (i.e. four slots) or vice versa. As mentioned above, asymmetry with respect to base station/PAD communications is contemplated and it is further contemplated that asymmetric base station/PAD communications may be used in combination with asymmetric data/voice TDMA. Those skilled in the art having the benefit of the description herein will appreciate other asymmetric numbers of slot allocations for base station/PAD communications and/or data/voice communications without departing from the scope the present invention.

To achieve frequency hopping, the transmit and receive carrier frequencies are changed by the baseband processor 180 reprogramming a phase locked loop (PLL) in the single chip radio transceiver 162. The transmit and receive carrier frequencies are changed by the baseband processor 180 in a pseudo-random fashion, to one of the other seventy-four carrier channels after two consecutive frames thus providing fifty (50) hops/second.

Referring to FIG. 8b, a time slot dedicated to data allocates 80 bits in the B field to a Forward Error Correction Code (FECC). The remaining 240 bits are payload data for processing by the PAD 100. A time slot dedicated to voice allocates the entire 320 bits in the B field to voice information since voice is tolerant to dropouts in bit patterns.

So-called "multi-slot" operation (e.g. double slot) is further contemplated wherein adjacent slots share a single set of sync, signaling, CRC bits and optionally, FECC bits. In a single data slot, the sync, signaling, CRC and FECC bits consume 180 out of the 420 bits allocated to a slot. By way of illustration and not of limitation, a double data slot shares one 32-bit preamble for synchronization, one 64 bit A-field for signaling, one set of 80 FECC bits and one set of four CRC bits, thus providing 660 payload data bits over two slots instead of the standard 480 bits—a 37.5% increase in bandwidth. Those skilled in the art having the benefit of the description herein will appreciate other multi-slot configurations (e.g. quad slots) and allocation of overhead bits without departing from the scope the present invention.

5.0 PAD to Base Station Synchronization

On power up, the baseband processor 180 in the transceiver module 125 of the PAD 100 executes code to set the received carrier frequency to a reference channel and to scan for incoming data during a time period of two frames (e.g. 20 milliseconds). If an A-Field with a correct CRC is detected, the baseband processor 180 continues to sample and decode A-Fields every frame (e.g. 10 milliseconds) for the expected ID of the base station 102. If a timeout occurs, the baseband processor 180 code restarts with the next carrier frequency channel. If the correct ID for the base station 102 is received, the A-field decoding continues until the current slot number, frame number, multi-frame number, and carrier channel in which the base station 102 is scanning are received. The base band processor 180 updates its corresponding internal variables and enters into a locked state when this information is received.

The baseband processor 180 in the transceiver module 125 of the base station 102 executes code to fix the transmit carrier frequency to a reference channel until the PAD 100 synchronizes. Thereafter, the baseband processor 180 executes code to change the transmit carrier frequency in the transceiver module 125 of the base station 102 every two frames (e.g. 20 milliseconds) in a pseudo-random sequence so long as correct A-Fields are found in two consecutive frames. The PAD 100 continues to receive A-Fields until the expected ID of the base station 102 is received or a timeout occurs. If a timeout occurs, the process is restarted with the reference channel frequency.

6.0 PAD-to-PAD Communications

PAD-to-PAD communications is further contemplated wherein multiple PADs communicate with one another through a common base station 102. By way of illustration and not of limitation, a second PAD 100' is added to FIG. 2 wherein PADs 100 and 100' communicate with one another via the base station 102. Each PAD 100 and base station have a unique ID associated with it that can be embedded in the A-field (64 bits of signaling) of the intended target. The baseband processor 180 in the transceiving module 125 of the base station 102 detects whether the received ID in the A-field is intended for the base station 102. If so, the voice/data information associated with that A-field is processed and routed to the respective voice/data network tethered to the base station 102. If not, the base station 102 relays the voice/data information associated with that A-field onto the intended PAD 100'.

7.0 Conclusion

Although the Detailed Description of the invention has been directed to certain exemplary embodiment, various modifications of these embodiments, as well as alternative embodiments, will be suggested to those skilled in the art. The invention encompasses any modifications or alternative embodiments that fall within the scope of the claims.

What is claimed is:

1. A transceiving unit for wireless communications over the industrial-scientific-medical (ISM) spectrum comprising:
   (a) an RF sub-module for transceiving information in a predefined frequency band; and
   (b) a processor coupled and adapted to provide time slot and frame timing to the RF sub-module, wherein N hopping frequencies ranging between X MHz and Y MHz and a minimum hop rate of Z hops per second are maintained, the N hopping frequencies are spaced K MHz apart and each of the N hopping frequencies support an R millisecond frame having M time slots that change carrier signals after a predetermined number of consecutive frames, and wherein at least one time slot of the frame shares at least one of a set of sync bits, a set of signaling bits, a set of CRC bits or a set of FECC bits with at least one adjacent time slot of the frame, and wherein N and M are integers and K, R, X and Y are real numbers.

2. The transceiving unit as recited in claim 1 wherein the baseband processor comprises first and second means for supporting concurrent voice and data communications.

3. The transceiving unit as recited in claim 1 wherein each time slot comprises a 32-bit preamble for synchronization, a 64 bit A-field for signaling and a B-field comprising 320 bits and 4 bits for CRC.

4. The transceiving unit as recited in claim 1 wherein unequal amounts of time slots are allocated between voice and data communications.

5. The transceiving unit as recited in claim 1 wherein time slots 1, 2, 3 and 9, 10, 11 are allocated for data communications and time slots 4, 5, 6 and 12, 13, 14 are allocated for voice communications.

6. The transceiving unit as recited in claim 5 wherein time slot 8 is allocated to program the transmit carrier frequency and slot 16 is allowed to program the receive carrier frequency.

7. The transceiving unit as recited in claim 5 where time slots 1, 2, 3 and 9, 10, 11 allocate 80 bits in a B field of each time slot to a Forward Error Correction Code (FECC).

8. The transceiving unit as recited in claim 5 wherein time slots 4, 5, 6 and 12, 13, 14 allocate an entire B-field of each time slot to voice information.

9. The method of claim 1, wherein the predetermined number of consecutive frames is two.

10. The tranceiving unit of claim 1, wherein N is 75, M is 16 and Z is approximately 2.5.

11. The transceiving unit of claim 10, wherein K is approximately 1.063, R is approximately 10, X is approximately 2401.122 and Y is approximately 2479.813.

12. A wireless communications method over the industrial-scientific-medical (SM) spectrum comprising:
   (a) transceiving information in a 2.4 to 2.5 GHz band to support concurrent voice and data information packetized into plural time slots with a time frame, each of the plural time slots being associated with one of first plurality of carrier frequencies, and each of the plural time slots changing to another one of the first plurality of carrier frequencies after a predetermined number of consecutive frames, and wherein at Least one time slot of the plural time slots shares at least one of a set of sync bits, a set of signaling bits, a set of CRC bits or a set of FECC bits with at least one adjacent time slot of the plural time slots; and
   (b) a processor to provide time slot and frame timing for step (a) such that the first plurality of carrier frequencies between 2.4 GHz and 2.4835 GHz and a minimum bop rate of 2.5 hops per second are maintained.

13. The method as recited in claim 12 further comprising providing time slot and frame timing such that the first plurality of carrier frequencies includes seventy-five carrier frequencies that are programmed ranging between 2401.122 MHz to 2479.813 MHz and spaced 1.063 MHz apart.

14. The method as recited in claim 13 further comprising providing time slot and frame timing such that each of the seventy-five carrier frequencies supports a ten-millisecond frame.

15. A system for wireless communications over the industrial-scientific-medical spectrum comprising:
   (a) a base station unit having a first transceiving unit;
   (b) a cordless personal access device having a second transceiving unit; and
   (c) the first and second transceiving units including:
      (i) an RF sub-module for transceiving information in a 2.4 to 23 GHz band; and
      (ii) a processor coupled and adapted to provide time slot and frame timing to the RF sub-module wherein a first plurality of carrier frequencies between 2.4 GHz and 2.4835 GHz and a minimum hop rate of 2.5 hops per second are maintained and to support a frame that has sixteen time slots that change carrier channels after two consecutive frames, wherein at least one time slot of the fame shares at least one of a set of sync bits, a set of signaling bits, a set of CRC bits or a set of FECC bits with at least one adjacent time slot of the frame.

16. A method comprising:
   (a) determining a current frame of a first plurality of frames to transmit data to a target device, each frame of the first plurality of frames residing at a unique carrier range in a 2.4 to 2.5 GHz band;
   (b) determining data to be transmitted over a plurality of time slots of the current frame, wherein at least one time slot of the plurality of time slots shares at least one of a set of sync bits, a set of signaling bits, a set of CRC bits or a set of FECC bits with at least one adjacent time slot of the plurality of time slots;

(c) determining a different frame of the first plurality of frames, wherein the different frame and the current frame are not the same frame; and (d) identifying the different frame as the current frame after a predetermined number of frame cycles, and repeating (b), (c) and (d).

17. The method of claim 16 wherein the plurality of time slots is sixteen time slots.

18. The method of claim 17, wherein the first plurality of frames includes seventy-five frames spaced 1.063 MHz apart.

19. The method of claim 18, wherein each frame has a ten-millisecond duration.

20. The method of claim 16, wherein the fist plurality of frames includes seventy-five frames spaced 1.063 MHz apart.

21. The method of claim 20 wherein each frame has a ten-millisecond duration.

* * * * *

UNITED STATES PATENT AND TRADEMARK OFFICE
CERTIFICATE OF CORRECTION

PATENT NO.       : 6,958,987 B1
APPLICATION NO. : 09/478144
DATED            : October 25, 2005
INVENTOR(S)      : Christopher M. Herring It is certified that error appears in the above-identified patent and that said Letters Patent is hereby corrected as shown below:

Column No. 9, Line No. 63 change "B Field" to --B-Field--

Column No. 10, Line No. 14 change "of first" to --of a first--

Column No. 10, Line No. 18 change "Least" to --least--

Column No. 10, Line No. 27 change "bop" to --hop--

Column No. 10, Line No. 45 change "23" to --2.5--

Column No. 10, Line No. 54 change "fame" to --frame--

Column No. 12, Line No. 3 change "fist" to --first--

Signed and Sealed this

Twenty-second Day of August, 2006

JON W. DUDAS
*Director of the United States Patent and Trademark Office*